Figure 1B:
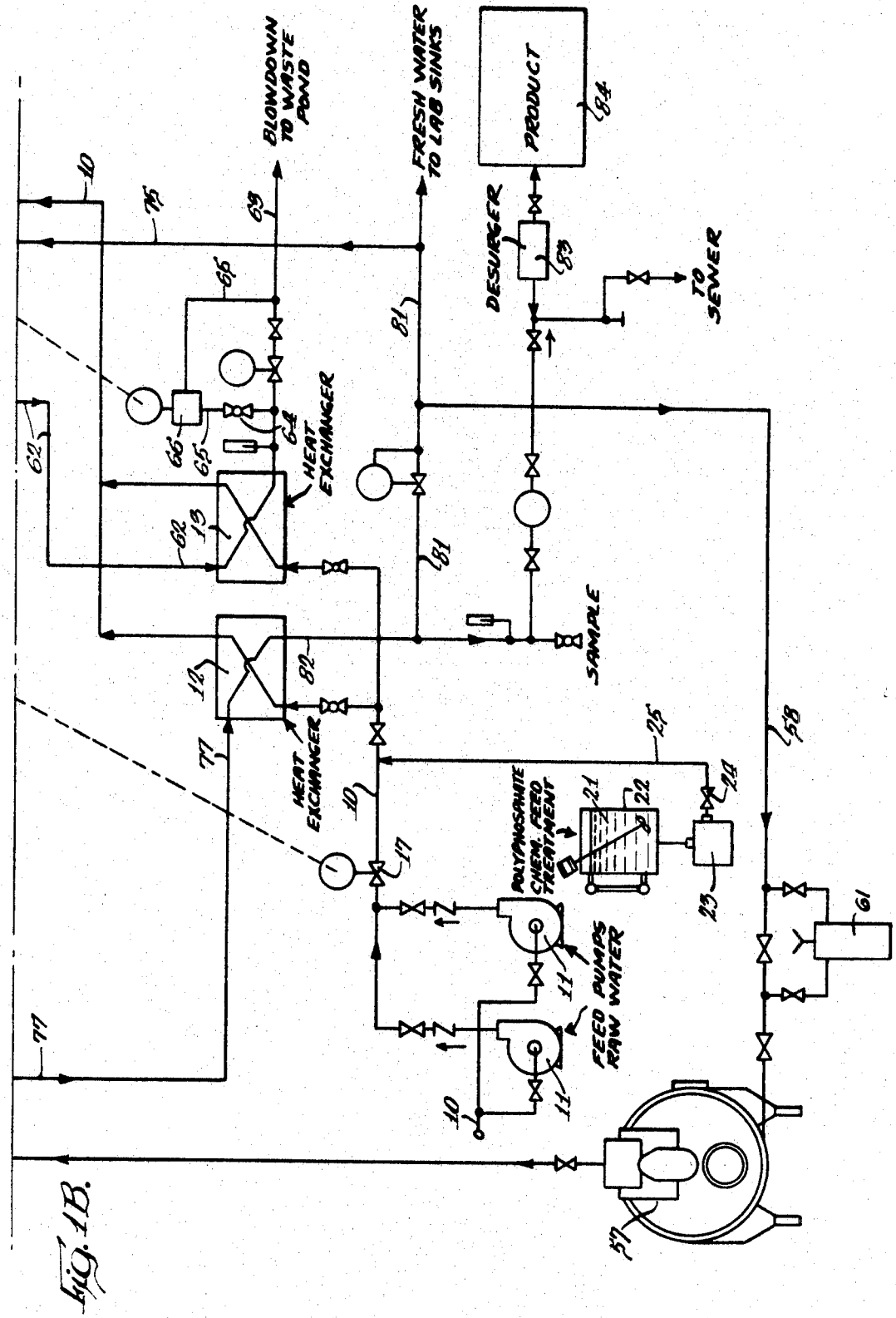

June 18, 1968

R. W. GOELDNER 3,389,059

METHOD AND APPARATUS FOR PURIFYING WATER BY DISTILLATION
WHILE PREVENTING CORROSION BY SELECTIVE
PHOSPHATE AND ACID ADDITION

Filed Jan. 27, 1965

2 Sheets-Sheet 2

INVENTOR.
Richard W. Goeldner
BY
Hofgren, Wegner,
Allen, Stellman & McCord
Attys

United States Patent Office 3,389,059
Patented June 18, 1968

3,389,059
METHOD AND APPARATUS FOR PURIFYING WATER BY DISTILLATION WHILE PREVENTING CORROSION BY SELECTIVE PHOSPHATE AND ACID ADDITION
Richard W. Goeldner, Brookfield, Wis., assignor to Aqua-Chem, Inc., a corporation of Wisconsin
Filed Jan. 27, 1965, Ser. No. 428,402
6 Claims. (Cl. 203—1)

This invention relates to a method and system for the distillation or evaporation of impure water such as carbonate- or bicarbonate-containing water. More particularly, the invention relates to pretreatment of water for corrosion inhibition where the water is to be used as a feed to a distillation zone, e.g., a vapor compression distillation zone and especially where the water is preheated by heat exchange prior to distillation.

In the distillation or evaporation of water, the water can be evaporated by contact with heated surfaces, e.g., by spraying on heat exchange surfaces in a still or evaporator. It is also desirable, for conservation of heat, to employ a preheater in the feed line to the still for passing the feed in heat exchange with materials withdrawn or recovered from the still, i.e., bottoms and/or distillate. Such preheating brings the feed water temperature up to a level below the distillation temperature while cooling withdrawn bottoms and/or distillate. For example, a distillation system may include a vapor compression still operating slightly above the atmospheric boiling point of water; and the recovered distillate, after compression and condensation within the still, may be removed from the still and passed through the feed preheater. Stills in such systems may be provided with deaeration equipment for removal of carbon dioxide and oxygen prior to passage of the feed to the heat exchange surfaces to decrease corrosion of the heat exchange surfaces.

Impure water, e.g., brackish and sea water, can be subjected to distillation for obtaining purified water as recovered distillate. The feed water often includes carbonate and hydroxy ions which tend to form scales on heat exchange surfaces. Polyphosphates are widely recognized inhibitors for use in brackish and sea water. However, at high temperatures, as may be encountered during distillation of water, polyphosphates are destroyed and are therefore ineffective. It has been found that inorganic acids destroy carbonate and/or bicarbonate and hydroxy ions which would normally form insoluble precipitates, e.g., in the form of calcium carbonate and magnesium hydroxide, on the heat exchange surfaces of the still. However, such acids, if the water is fed directly through a heat exchanger after addition of the acid, tend to cause corrosion of the heat exchange surfaces, presumably because of carbon dioxide formed in the water by action of the acid on the carbonate and/or bicarbonate.

It is a general object of this invention to provide a new and useful method and system for treating water to be distilled.

Another object is to provide a new and useful system for purifying water which contains a carbonate, bicarbonate, or a mixture thereof, in which system a preheating step and distilling step are utilized, while inhibiting corrosion in both the preheater and the still.

Still another object is to provide for pretreatment of feed water with polyphosphate for prevention of scale below the destruction temperature of the polyphosphate and for pretreatment of the feed water with acid without increasing the corrosiveness of the feed water toward a preheater in a system in accordance with any of the foregoing objects.

Figure 1A:
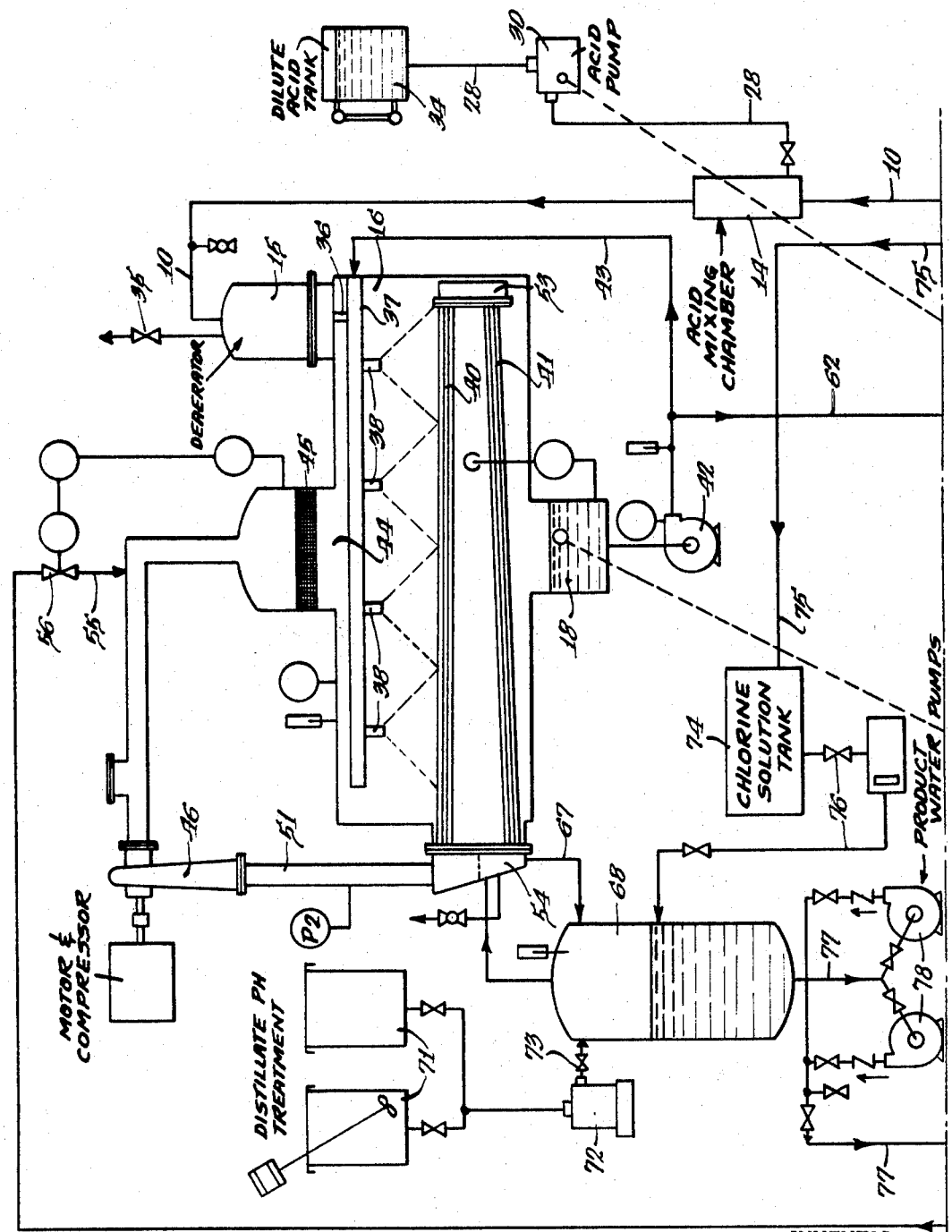

Other objects will be apparent from the following description and the drawing in which the figure, on two shets labeled FIG. 1A and FIG. 1B, is a flow diagram of a form of system useful for carrying out a distillation method in accordance herewith.

While this invention is susceptible of embodiment in many different forms, there is shown in the drawing and will herein be described in detail a specific embodiment of the invention with the understanding that the present disclosure is to be considered as an exemplification of the principles of the invention and is not intended to limit the invention to the embodiment illustrated.

In the present invention, impure water is treated with polyphosphate and the water is then preheated to a temperature below the destruction temperature of the polyphosphate. Thereafter, an acid, preferably an inorganic or mineral acid, is added to the water, the water is distilled or vaporized and the distillate is recovered. Preferably, the water is deaerated for removal of carbon dioxide and oxygen after addition of the acid and before distillation of the water.

Referring now to the drawing, raw feed water is brought in through conduit 10 by feed pumps 11 and passes through parallel heat exchangers 12 and 13, an acid mixing chamber 14, a deaerator 15 and into vapor evaporator 16 until the proper liquid level is provided in evaporator 16. A valve 17 controls the flow rate of feed water through conduit 10 responsive to the liquid level of brine in the hot well 18 of evaporator 16 in a conventional manner. The control is indicated by a dotted control line. A body 21 of polyphosphate scale inhibiting chemical solution is disposed in an appropriate reservoir 22 from which the solution is withdrawn by a pump 23, past an on-off valve 24 and is directed by a conduit 25 into conduit 10 upstream from the heat exchangers 12 and 13. The solution of polyphosphates from conduit 25 mix with the feed water in conduit 10, and the resulting mixture (hereafter, pretreated feed) moves through conduit 10 and heat exchangers 12 and 13 to acid mixing chamber 14.

A solution of dilute acid, e.g., sulfuric acid, of known concentration, is contained in a dilute acid storage tank 34. The acid may be prepared from contrated acid and fresh water and added to tank 34 as needed. The acid is drawn from tank 34 through conduit 28 by an acid metering pump 30, and is charged by pump 30 to the acid mixing chamber 14 where it is mixed with pretreated feed in an amount sufficient to adjust the pretreated feed to a predetermined or preselected alkalinity. The resulting acidified pretreated feed (hereafter, treated feed) moves from mixing chamber 14 through conduit 10 and deaerator 15, to be sprayed or otherwise distributed on heating surface disposed in the vaporizing chamber of evaporator 16.

In deaerator 15, the treated feed is passed in countercurrent flow with a minor stream of vapor rising from the vaporizing chamber of evaporator 16. The vapor passes through the feed water in deaerator 15 and removes carbon dioxide and oxygen which would otherwise cause corrosion problems in evaporator 16. Any necessary venting is accomplished by a vent 35. The treated feed then passes through a conduit 36 to a spray nozzle manifold 37 which supplies a plurality of spray nozzles 38 for spraying the treated feed on the exterior heating surfaces of heat exchange tubes 40 and 41.

Hot brine from the vaporizing chamber is collected in hot well 18 and is delivered from hot well 18 by means of a brine withdrawal and circulating pump 42, and a portion of the withdrawn brine is recycled through a recycle line 43 to the manifold 37 where it is added to treated and deaerated feed from conduit 36 so that the fluid conveyed into the vaporizing chamber comprises a mixture including treated feed and recycled brine. A make-up heat exchanger (not shown) may be provided in recycle line 43, if desired.

In the illustrated system, in evaporator 16, the liquid leaving the spray nozzles 38 is directed against the heat exchange surfaces defined by the outer surfaces of tubes 40 and 41; and, due to the heat and pressure to which the spray liquid is subjected inside the vaporizing chamber, a portion of the water contained in the liquid vaporizes and collects in a wet vapor zone 44 above tubes 40 and 41 and below a demister or entrainment separator 45. A vapor recompression and recycle system is provided including a motor driven compressor 46 which draws vapors at a generally steady volume rate from the vapor collection 44 through the demister 45 and out of the vapor evaporator 16 by means of a vapor exit conduit 48. As the vapors pass through demister 45 they are intimately contacted with the demister surfaces, entrainment water droplets collect on the surfaces and the droplets are coalesced and return by gravity to the vaporizing chamber.

The vapor compressor 46 compresses the withdrawn vapor and discharges it through a conduit 51 to a manifold 52 which is the entrance to the inside of the heat exchange tubes 40. The vapor flows through manifold 52 and tubes 40 and then to a return manifold 51 from which the vapor flows through tubes 41 to a distillate collection manifold 54. As the vapor flows through tubes 40 and 41, it gives up at least a part of the heat of compression and its latent heat to the deaerated treated feed being sprayed against or flowing over the outside of tubes 40 and 41 for vaporizing water from the feed. Condensate from the vapors flowing through tubes 41 collects in the distillate collection manifold 54.

As the vapors are drawn through the vapor exit conduit 48, steam can be added from line 55, controlled by valve 56. The steam in line 55 is generated by a boiler 57 receiving fresh water from line 58 which may be pretreated as desired or needed in boiler treatment feed pot 61. The steam in line 55 is at a temperature sufficient to introduce make-up heat into the evaporator system as needed, and valve 56 can be controlled for this purpose in response to the operating temperature of evaporator 16.

The portion of bottoms or brine withdrawn from hot well 18 through line 43 which is not recycled to manifold 38 is directed through line 62 and heat exchanger 13 in heat exchange with pretreated feed. The bottoms may then be discharged through line 63 as blow-down to a waste pond after being passed by valve 64 through line 65 and pH detector 66. The pH detector 66 continuously checks the pH of the bottoms or brine stream and controls acid pump 30, as indicated by the dotted control line, to meter the appropriate amount of acid into tank 14 to bring the pH of the brine into a predetermined or preselected pH range, preferably 7.0 to 7.4 when brackish water or sea water is used as feed.

The condensed distillate in manifold 54 is directed by line 67 to a distillate treating tank 68 where the distillate is treated with chemicals introduced from tanks 71 by pump 72 and line 73 to adjust the distillate pH as desired. The chemicals in tanks 71 may be acids or bases but will more normally be bases. Suitable chlorine solution tank 74 receives fresh water from line 75 and mixes chlorine with the water for discharge through line 76 to distillate treating tank 68 for chlorinating the distillate as it passes through tank 68. The treated distillate is withdrawn from tank 68 through line 77 by pumps 78 and directed through heat exchanger 12 in heat exchange with incoming pretreated feed for preheating the fed. A portion of the treated distillate is directed through line 81 to a fresh water supply, e.g., for laboratory sinks and the like. The treated distillate in line 81 constitutes fresh water which can also be directed through lines 58 and 75 to the boiler 57 and tank 74, respectively. The remainder of the treated distillate is directed through line 82 and a desurger 83 to a fresh water product storage tank 84.

The polyphosphates referred to heretofore are those polyphosphates effective for treatment of feed waters for prevention of scale formation, especially at temperatures not materially in excess of 190–200° F. A variety of such polyphosphates is available, and the polyphosphates may comprise, for example, one or more of the following: tetrasodium pyrophosphate, sodium tripolyphosphate, and sodium hexametaphosphate. For treatment of sea water and brackish water, an acceptable rate of polyphosphate addition to the feed is in the range of .5–10 parts polyphosphate per million parts of feed water. Such small amounts of polyphosphate do not materially adversely affect scale formation in the evaporator. Because of the tendency of such polyphosphates to be destroyed at temperatures materially in excess of about 200° F., it is preferred that the heat exchangers 12 and 13 be such to provide an exit temperature for the pretreated feed below 200° F. and more preferably not exceeding 190–195° F.

After passing through the heat exchangers, as has been noted, the pretreated feed is treated with acid prior to entry into the vaporizing chamber into the evaporator. The acid may be any acid which is capable of reacting with carbonates and/or bicarbonates in the water to liberate carbon dioxide which may remain dissolved within the water. Common acids, usually inorganic, include sulfuric acid, hydrochloric acid, phosphoric acid, nitric acid, sodium bisulfate, sulfamic acid, citric acid, etc., as well as such acidic salts as ferric chloride and aluminum sulfate. It is preferred that the acid be added to the pretreated feed on a generally continuous basis, i.e., to a major portion of the pretreated feed stream and during 50% or more of the feed time. The carbon dioxide formed in the water is removed, along with oxygen, prior to entry of the water into the vaporizing chamber of the evaporator. In the system illustrated, such carbon dioxide removal is effected by deaerator 15.

As a more specific example of a method carried out in the system illustrated in the drawing, raw sea water is fed by pumps 11 through line 10 at a rate of 26,700 lbs. per hour with polyphosphate addition from line 25 at a rate of one part per million parts of water; and sufficient sulfuric acid is added in mixing chamber 14 to initially reduce the alkalinity of the sea water to a level of alkalinity equal to 10 to 30 p.p.m. $CaCO_3$, the preferred range for sea water and brackish water. The vapor compression evaporator 16 is operated at 215° F. and a pressure of 15.7 p.s.i.a. Compressor 46 is driven to provide a pressure of 19.7 p.s.i.a. in line 51. Distillate is withdrawn, and, after chemical treatment in tank 68, is passed through heat exchanger 17 and is discharged to storage tank 84 at a rate of 13,300 lbs. per hour. Brine withdrawn through line 62 and passed through heat exchanger 13 is discharged through line 63 at a rate of about 13,400 lbs. per hour. Feed water exiting from heat exchangers 12 and 13 is at an average temperature of about 190° F. No withdrawal from the system is needed through line 81 for use as fresh water in laboratory sinks or the like in the illustrative example, although such withdrawal can be made, with corresponding degrees in product output through line 82. The brine from line 52 is continuously diverted through line 65 and through the pH controller unit 66. In this example, brine pH is to be maintained in the range of 7.2 to 7.4, e.g., at about 7.3; if the pH drops below about 7.3, the rate of acid addition by pump 30 is decreased, and, if the pH rises above about 7.3, the rate of acid addition by pump 30 is increased until the pH is brought to about 7.3.

It will be apparent from the foregoing description that the present invention provides a method and system in which a preheater can be used for preheating feed water to a still and in which corrosion can be properly prevented in the preheater and still in a novel manner by the above described use of a polyphosphate chemical treating agent and an acid.

I claim:

1. A method of purifying impure water, which method comprises treating a feed stream of the water with polyphosphate, treating the polyphosphate-treated feed water with diluted acid, deaerating the resulting acid-treated feed water, directing the feed water as a feed to a vapor compression evaporator, operating said evaporator for vaporizing feed water and compressing and directing distillate through the heat exchange tubes for vaporizing additional feed water to form a distillate overhead and brine bottoms, recovering resulting condensate from the heat exchange tubes, passing the condensate in heat exchange with feed intermediate the polyphosphate-treating step and the acid-treating step for preheating the feed water to a temperature no higher than about 200° F., whereby the polyphosphate inhibits scale formation in the heat exchanger, withdrawing brine from said evaporator, passing withdrawn brine in indirect heat exchange with feed intermediate the polyphosphate-treating step and the acid-treating step for preheating feed water to a temperature no higher than about 200° F., detecting the pH of the evaporator brine, and controlling the rate of acid addition to the feed water in the acid-treating step in response to such detecting for providing a preselected brine pH in the evaporator.

2. A method of purifying impure water, which method comprises treating a feed stream of the water with .5 to 10 p.p.m. polyphosphate, passing the polyphosphate-treated feed through a preheating zone in contact with heat exchange surfaces for heating the feed to a temperature below the thermal decomposition temperature of the polyphosphate, whereby the polyphosphate inhibits scale formation in the heat exchanger, treating the polyphosphate-treated feed water with sufficient dilute acid to provide an alkalinity equivalent to 10 to 30 p.p.m. calcium carbonate, removing carbon dioxide from the acid-treated feed water, directing the feed water as a feed to an evaporator having heat exchange tubes for vaporizing feed water from the outer surfaces thereof, providing a stream of steam, adding the steam to distillate from the evaporator, compressing the mixture of distillate and steam, directing the compressed mixture through the heat exchange tubes in the evaporator for vaporizing additional feed water to form additional distillate and a bottom brine, withdrawing resulting condensate from the compressed heat exchanged mixture, passing the withdrawn condensate through said preheating zone in heat exchange with feed water for preheating feed water below the polyphosphate thermal decomposition temperature, withdrawing brine from said evaporator, returning a first portion of the withdrawn brine to the heat exchange tubes for vaporizing water therefrom, passing another portion of withdrawn brine as a stream separate from said withdrawn condensate through the preheating zone in heat exchange with feed for preheating feed water below the polyphosphate thermal decomposition temperature, detecting the pH of the evaporator brine, and controlling the rate of acid addition to the feed in the acid-treating step in response to such detecting for providing proper brine pH in the evaporator.

3. A system for distilling impure water containing carbonates which normally tend to deposit during distillation, which comprises means for treating the water with polyphosphate, means for treating the heat exchanged feed water with acid, means for deaerating the acidified feed water, a vapor compression distiller, means for introducing the deaerated feed water into said vapor compression distiller as a feed, means for withdrawing condensed distillate from the distiller, first heat exchanger means for directing the distillate in heat exchange with feed for preheating feed water to a temperature no greater than about 200° F., means for withdrawing brine as bottoms from the distiller, second heat exchanger means for directing a portion of the withdrawn brine through said heat exchanger means in heat exchange with feed for preheating feed water to a temperature no greater than 200° F., and means for controlling the rate of acid addition by the acid-treating means in response to pH of the distiller brine for providing a preselected brine pH in the distiller.

4. A method of purifying impure water, which method comprises treating a feed stream of water with polyphosphate, treating the polyphosphate-treated feed water with diluted acid, deaerating the resulting acid-treated feed water, directing the feed water as as feed to an evaporator, operating said evaporator for vaporizing feed water to form a distillate overhead and brine bottoms, condensing the distillate, recovering resulting condensate, passing the condensate in heat exchange with feed intermediate the polyphosphate-treating step and the acid-treating step for preheating the feed water to a temperature below thermal decomposition temperature of the polyphosphate, whereby the polyphosphate inhibits scale formation in the heat exchanger, withdrawing brine from said evaporator, and passing withdrawn brine in indirect heat exchange with feed intermediate the polyphosphate-treating step and the acid-treating step for preheating feed water to a temperature below thermal decomposition temperature of the polyphosphate.

5. A system for distilling impure feed water containing carbonates which normally tend to deposit during distillation, which comprises means for treating the said water with polyphosphate, first heat exchanger means for directing the polyphosphate-treated feed water in heat exchange with product distillate for preheating the polyphosphate-treated feed water to a temperature below the polyphosphate thermal decomosition temperature, second heat exchanger means for directing the polyphosphate-treated feed water in heat exchange with brine for preheating the polyphosphate-treated feed water to a temperature below the polyphosphate thermal decomposition temperature, means for treating the preheated phosphate-treated feed water with acid, means for deaerating the acidified feed water, a still, means for introducing the deaerated water into said still as a feed, means for withdrawing condensed distillate from the still and for directing the distillate to said first heat exchanger for heat exchange with the feed and means for withdrawing brine as bottoms from the still and directing at least a portion of the withdrawn brine through said second heat exchanger means for heat exchange with feed water.

6. The system of claim 5 including means separate from said heat exchanger means for recycling another portion of the brine as feed to the still.

References Cited

UNITED STATES PATENTS

| | | | |
|---|---|---|---|
| 2,097,649 | 11/1937 | Solberg | 203—7 |
| 3,119,752 | 1/1964 | Checkovich | 203—11 |
| 3,218,241 | 11/1965 | Checkovich | 203—7 |
| 3,245,833 | 4/1966 | Loebel | 203—7 |

WILBUR L. BASCOMB, Jr., *Primary Examiner.*